(12) United States Patent
Rehn et al.

(10) Patent No.: US 6,247,763 B1
(45) Date of Patent: Jun. 19, 2001

(54) PRESSURE FLUID RESERVOIR FOR A VEHICLE HYDRAULIC BRAKE SYSTEM

(75) Inventors: Jan-Michael Rehn, Stuttgart; Harald Ott, Leonberg, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/410,051

(22) Filed: Oct. 1, 1999

(30) Foreign Application Priority Data

Oct. 8, 1998 (DE) .............................................. 198 46 369

(51) Int. Cl.[7] .................................................. B60T 17/04
(52) U.S. Cl. .............................. 303/30; 138/137; 428/36.9
(58) Field of Search .............................. 303/30, 163, 165, 303/85, 86; 138/118.1, 123, 124, 125, 137, 138, 177; 428/34.1, 36.9, 36.91

(56) References Cited

U.S. PATENT DOCUMENTS

| 3,665,967 | * | 5/1972 | Kachnik | 138/137 |
| 4,096,888 | * | 6/1978 | Stefano et al. | 138/125 |
| 4,136,149 | * | 1/1979 | Payne | 138/137 X |
| 4,206,786 | * | 6/1980 | Wetmore | 138/178 |
| 4,651,781 | | 3/1987 | Kandelman . | |
| 5,622,210 | * | 4/1997 | Crisman et al. | 138/104 |

FOREIGN PATENT DOCUMENTS

4128386 * 3/1993 (DE) .

* cited by examiner

Primary Examiner—Robert J. Oberleitner
Assistant Examiner—Pamela J. Rodriguez
(74) Attorney, Agent, or Firm—Ronald E. Greigg; Edwin E. Greigg

(57) ABSTRACT

A pressure fluid reservoir for supplying pressure fluid to a wheel slip regulating device that is accommodated in a vehicle has a hose membrane that can be partially emptied by suction. The degree of emptying is limited due to the installation of an inner support body that fluid can flow through. The radial expansion of the hose membrane is limited by an outer support element and by a porous casing encompassing the outer support element, which protects the pressure fluid reservoir from bursting in the event that the hose membrane is subjected to brake pressure. The inner support element, the outer support element, and the casing are flexible hoses and are connected in a pressure-tight fashion to tube line connections in such a way that the pressure fluid reservoir according to the invention is placed in the vehicle in the same way as a brake line.

8 Claims, 2 Drawing Sheets

PRESSURE FLUID RESERVOIR FOR A VEHICLE HYDRAULIC BRAKE SYSTEM

BACKGROUND OF THE INVENTION

The invention is based on a pressure fluid reservoir for a vehicle hydraulic brake system.

German patent disclosure DE 41 28 386 A1 discloses a pressure fluid reservoir that is for a vehicle hydraulic brake system and defines this generic type. The vehicle brake system includes a master cylinder, a number of wheel brake cylinders for a number of wheel brakes, and a wheel slip regulating device that is disposed between the master cylinder and the wheel brake cylinders, which is equipped to limit drive slip of drivable vehicle wheels through the use of wheel brakes. Wheel brake cylinders of these wheel brakes are connected to the wheel slip regulating device by means of brake lines and the wheel slip regulating device is in turn connected to the master cylinder through at least one pressure fluid reservoir with the aid of at least one brake line. The wheel slip regulating device has at least one pump which is supplied with pressure fluid from the pressure fluid reservoir and/or the master cylinder in order to produce pressure that can be initiated in order to introduce brake pressure into the wheel brake cylinders for the purpose of drive slip limitation. Between two hydraulic connections, the pressure fluid reservoir has a hose membrane as a reservoir element, and inside the hose membrane has an inner support element that partially fills the normal internal cross-section of this hose membrane, an air-permeable external support element that encloses the hose membrane and against which the hose membrane can be placed, and a casing which is likewise air-permeable and encompasses the outer support element, for example in a play-free manner. The inner support element, the outer support element, and the casing are embodied as rigid and have relatively large diameters in relation to their lengths. When the pump aspirates pressure fluid in order to carry out drive slip regulation, then it predominantly withdraws the fluid from the hose membrane of the pressure fluid reservoir, wherein the diameter of the hose membrane temporarily becomes smaller. As soon as the pump is no longer aspirating and/or pressure fluid is being pushed to the wheel slip regulating device by means of the master cylinder, the hose membrane assumes its original dimensions once more and thereby rests against the outer support element. With prevailing master cylinder pressure, the outer casing protects the outer support element from bursting since this would result in a bursting of the hose membrane.

It can be viewed as disadvantageous that this pressure fluid reservoir, if it is tightly screw-connected to wheel slip regulating device, prevents it from being accommodated in the vehicle. This pressure fluid reservoir can also be accommodated anywhere between the wheel slip regulating device and the master cylinder, but this requires the installation of a first main brake line section between the master cylinder and the pressure fluid reservoir and a second main brake section between the pressure fluid reservoir and the wheel slip regulating device with the result that, four screw connections must be mounted in the vehicle for this purpose.

OBJECT AND SUMMARY OF THE INVENTION

The pressure fluid reservoir according to the invention has the advantage over the prior art that it can be installed in the form of an uninterrupted brake line, and thereby assumes its function. Due to flexibility, the pressure fluid reservoir according to the invention is about as easy to install as a conventional main brake line made of flexible metal tubing or hose material. Thus clearly, few assembly costs are incurred and the accommodation of the wheel slip regulating device inside the vehicle is not hindered.

Advantageous improvements and updates of the pressure fluid reservoir are possible by means of the measures taken hereinafter.

The inner support element can be inexpensively manufactured and result in a favorable flexibility of this support element so that the installation of the pressure fluid reservoir according to the invention in the vehicle is not hindered.

The wire ends are inexpensively keep away from the hose membrane and thus prevent damage to the hose membrane and the formation of leaks in the hose membrane.

A choice of material which renders the inner support element impervious to corrosion or mechanical stress is provided.

In carrying out the invention an advantage is that with the withdrawal of pressure fluid from the pressure fluid reservoir, ambient air travels through the outer support element to the outer circumference of the hose membrane so that a suction that can be produced by a pump is available essentially for elastically narrowing the hose membrane.

The casing is sufficiently flexible and through the influence of pressure produced in the master cylinder, the pressure fluid reservoir takes in as little additional pressure fluid as possible. This is because an additional admission of pressure fluid by the pressure fluid reservoir during normal braking would result in a disadvantageously long brake pedal path.

In carrying out the invention, an advantageous embodiment with regard to a desired long, malfunction-free operation time is provided.

The invention will be better understood and further objects and advantages thereof will become more apparent from the ensuing detailed description of preferred embodiments taken in conjunction with the drawings.

DESCRIPTION OF THE PREFERRED EMBODIMENTS

The pressure fluid reservoir 2 according to the invention is installed, for example, between a master cylinder 3 and a brake slip regulating device 4 of a vehicle brake system 5, only a detail of which is shown.

For example, the master cylinder 3 is a dual-circuit tandem master cylinder that is depicted in DE 41 28 386 A1 and a so-called pneumatic brake booster is disposed between this tandem master cylinder and a brake pedal.

The brake slip regulating device 4 can for example be inferred from the prior art and therefore does not need to be described in detail here. One choice, for example, is the brake slip regulation system according to DE 41 28 386 A1 and that of DE 195 29 363 A1, which in addition to the brake slip regulation upon actuation of a brake pedal and in addition to the drive slip regulation of drivable wheels, is also improved as a driving dynamics regulating device. A driving dynamics regulating device, known by the German term Fahrdynamikregeleinrichtung and abbreviated FDR, is understood to mean a device which automatically observes the behavior of the vehicle when driving straight and when negotiating curves and when necessary, improves the controllability of the vehicle by means of automatic, side-specific, individual braking of the vehicle. Such a regulating system is also known under the names Electronic Stability Program, which is abbreviated ESP, and Vehicle Dynamics Control, which is abbreviated VDC. It is consequently clear that the pressure fluid reservoir 2 according to the invention can be used in wheel slip regulating devices that have been modified in an intrinsically arbitrary fashion for drive slip regulating purposes and driving stability purposes. Because such wheel slip regulating devices are as a rule connected to dual-circuit master cylinders, it is also clear that the disposition represented here of only one pressure fluid reservoir 2 includes the depiction of only one brake circuit of a for example dual-circuit vehicle brake system.

Figure 2:
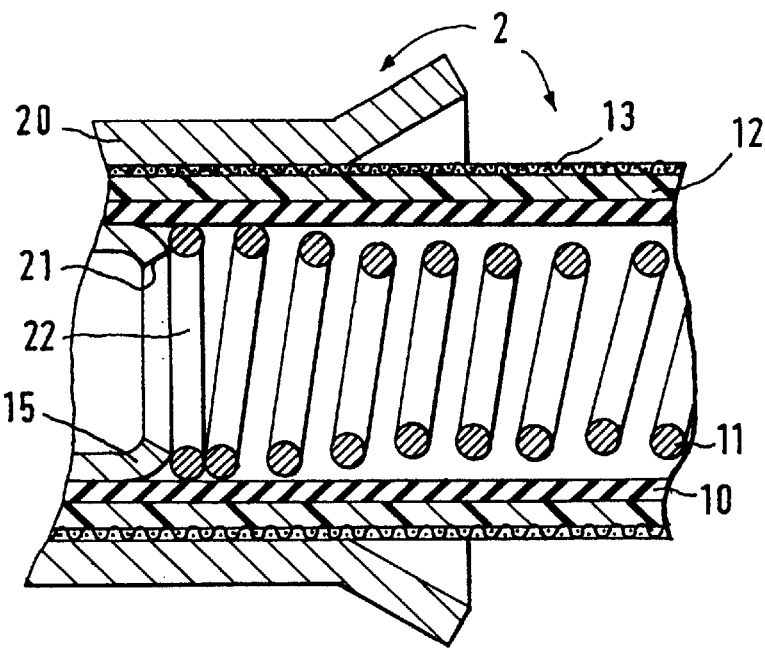
FIG. 2 shows a longitudinal section through a detail of the pressure fluid reservoir according to the invention from FIG. 1.

As can be inferred from the detailed enlargement shown in the longitudinal section in FIG. 2, the pressure fluid reservoir 2 has a hose membrane 10 as a reservoir element, and inner support element 11 that fluid can flow through, and an outer, preferably air-permeable support element 12 encompassing the hose membrane, and a casing 13 encompassing the outer support element 12.

Figure 4:
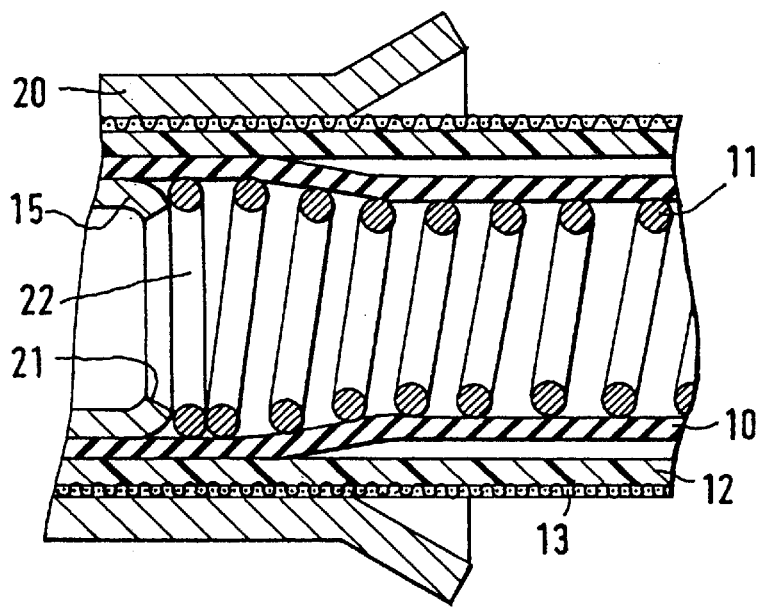
FIG. 4 shows another longitudinal section similar to FIG. 2, in this instance in the operational state of having been "sucked empty".

The hose membrane 10 is manufactured of a type of rubber proven for the manufacture of brake hoses, for example ethylene propylene rubber, abbreviated EPDM. In this connection, the hose membrane 10 is embodied as relatively thin-walled in such a way that a pressure difference between the outside and the inside on the order of magnitude of for example 0.2 bar leads to a diameter reduction of for example 10%. The inner support element 11 placed inside the hose membrane prevents a complete collapse of the hose membrane when there is a pressure difference greater than the one indicated. This inner support element 11 is embodied for example in the form of a helix made of steel wire, wherein stainless steel wire is preferable. Naturally, a helix made of plastic wire can also be used as an alternative. As shown in FIG. 2, when there is pressure equilibrium outside and inside the hose membrane 10, there is a radial distance between the hose membrane 10 and the inner support element 11 that is embodied in the form of a wire helix, whereas in FIG. 4 there is no radial distance between these parts because a pressure, which is disposed inside the hose membrane and is produced for example by means of switching on the wheel brake regulating device, is lower than an ambient atmospheric pressure. This pressure that is lower than the atmospheric pressure is produced by starting up a so-called self-aspirating return feed pump of the kind that is contained in DE 41 28 386 A1 and DE 195 29 363 A1. It is clear that the inner support element 11 limits the radial elastic deformation of the hose membrane 10. The inner support element 11, however, is also used to prevent a collapse of the cross section of the hose membrane 10 when the pressure fluid reservoir 2 is bent for the purpose of placement in a vehicle.

The outer support element 12 and the casing 13 have the task of preventing an undesired expansion of the hose membrane 10. To this end, the casing 13 is embodied for example as a metal braid, for example of stainless steel wires. Such a metal braid can be supplied for example by the US company Titeflex. This metal wire braid protects the outer support element 12 against mechanical damage, for example abrasion and bursting, when the hose membrane 10 is internally subjected to brake pressure.

The outer support element 12 is a flexible hose so that thanks to the above-mentioned flexibility of the inner support element 11 and the hose membrane 10 as well as the casing 13 embodied as a wire braid, the entire element combination is flexible like a brake hose and this wire, extending in a bent fashion, can be easily accommodated in a vehicle.

For example, the outer support element 12 is a porous and therefore air-permeable sintered hose made of Teflon or a hose that is perforated by small diameter openings and consequently is also air-permeable. Together with the air permeability of the outer casing 13, this produces the advantage that a small pressure reduction inside the hose membrane 10 relative to the ambient air pressure is sufficient to produce an elastic narrowing of the hose membrane 10 and therefore an outflow of pressure fluid normally present in the hose membrane 10 in the direction of the wheel slip regulating device as soon as this device is switched on.

Figure 1:
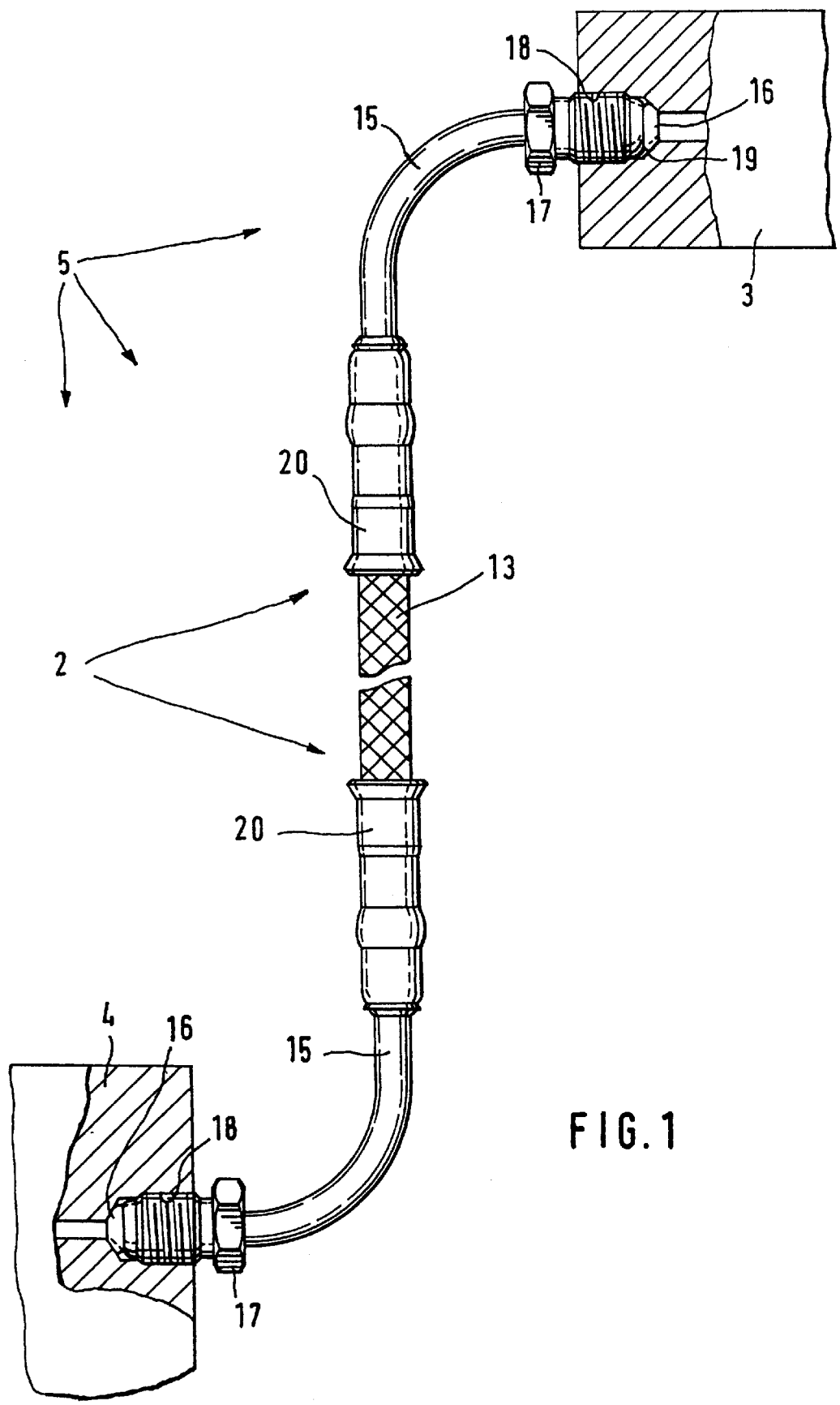
FIG. 1 shows an external view of the pressure fluid reservoir according to the invention in connection with a master cylinder and a wheel slip regulating device.

The combination according to the invention of a hose membrane 10, an inner support element 11, an outer support element 12, and the casing 13 is connected, for example by way of two tube line sections 15, to the master cylinder 3 on the one hand and to the wheel slip regulating device 4 on the other. To this end, e.g. for insertion and clamping in the master cylinder 3 and also the wheel slip regulating device 4, each tube line section 15 can have a so-called flange 16 of a known type. A so-called male fitting, which encompasses the respective tube line section 15 in a known manner with radial play, is respectively provided to press the flange in. The male fitting 17 is associated with a screw-in thread 18 disposed in the master cylinder 3 or the wheel slip regulating device 4. Smooth manufactured conical faces 19 are used for the hydraulically sealed disposition of the flange 16 in the master cylinder 3 or the wheel slip regulating device 4. The fastening of tube line sections 15 by means of a flange 16 and a male fitting 17 is a customary way of fastening brake lines of vehicle brake systems. This type of fastening using flanges 16 can naturally also be dispensed with by using other conventional screw, plug, or clamp techniques. To this extent, the type of fastening of tube line sections shown in FIG. 1 is not intended as a limitation.

Figure 3:
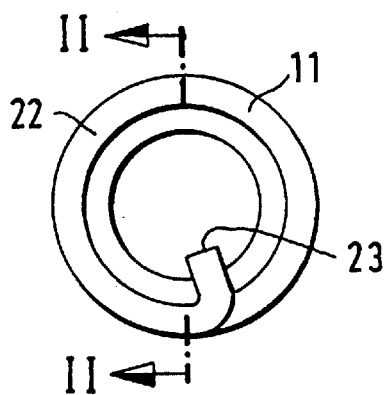
FIG. 3 shows a side view of a detail from FIG. 2.

A connection of the combination of the hose membrane 10, the inner support element 11, the outer support element 12, and the casing 13 can be carried out based on the expertise of brake hose manufacturers. For example, the tube line sections 15 end inside the hose membrane 10 and a sufficient radial pressure of the hose membrane 10, the outer support element 12, and the casing 13 is produced by means of a bushing 20 that is slid over them and is comprised of steel or a similarly pourable material. This is radially narrowed, for example after being slid on, in a manner that belongs to the prior art. Since the expert connection of hoses and tube line sections, such as the tube line sections 15, is a measure that is known to suppliers of brake hoses, details of it do not need to be discussed here. It is merely noted that inside the hose membrane 10, ends 21 of the tube line sections 15 are crimped radially inward so that no cutting edge can damage the hose membrane 10. Also, the inner support element 11 is embodied in the vicinity of its ends 22 in such a way that damage to the membrane hose 10 is prevented. This can be achieved in a technically inexpensive manner by wire ends 23 being bent radially inward. This is shown in FIG. 3.

When installing the flexible pressure fluid reservoir 2 according to the invention in a vehicle, it is clear—e.g. when installing rigid tube lines as brake lines—that an air bubble disposed, for example, in the lower tube line section 15 can move upward into the upper tube line section 15 in order to then be able to escape for example through the master cylinder 3 into its reservoir, not shown. For the membrane hose 10, it is therefore recommended that it be disposed as steeply as possible in the vehicle so that a possibly existing air bubble travels upward to the upper tube line section 15 and goes into the tube line section 15.

The foregoing relates to preferred exemplary embodiments of the invention, it being understood that other variants and embodiments thereof are possible within the spirit and scope of the invention, the latter being defined by the appended claims.

We claim:

1. A pressure fluid reservoir which is connected between two hydraulic connections, comprising a hose membrane (10) as a reservoir element, an inner support element (11) that fluid flows through and is disposed inside the hose membrane, an outer support element (12) encompassing the hose membrane, and a casing (13) encompassing the outer support element, the inner support element (11) is embodied as a wire helix, the outer support element (12) is embodied as a flexible air permeable hose and the casing (13) is embodied as a flexible hose.

2. The pressure fluid reservoir according to claim 1, in which wire ends (23) of the wire helix (11) are bent radially inward toward a longitudinal axis of the wire helix (11).

3. The pressure fluid reservoir according to claim 2, in which the wire helix (11) is comprised of stainless steel wire.

4. The pressure fluid reservoir according to claim 1, in which the outer support element (12) is comprised of a perforated hose.

5. The pressure fluid reservoir according to claim 1, in which the flexible air-permeable hose (12) is sintered out of polytetrafluoroethylene.

6. The pressure fluid reservoir according to claim 1, in which the casing (13) is embodied as a wire braid.

7. The pressure fluid reservoir according to claim 6, in which the wire braid is comprised of corrosion-resistant spring steel wires.

8. The pressure fluid reservoir according to claim 1, in which the outer flexible air-permeable hose (12) is sintered out of a plastic material.

* * * * *